Patented Dec. 8, 1942

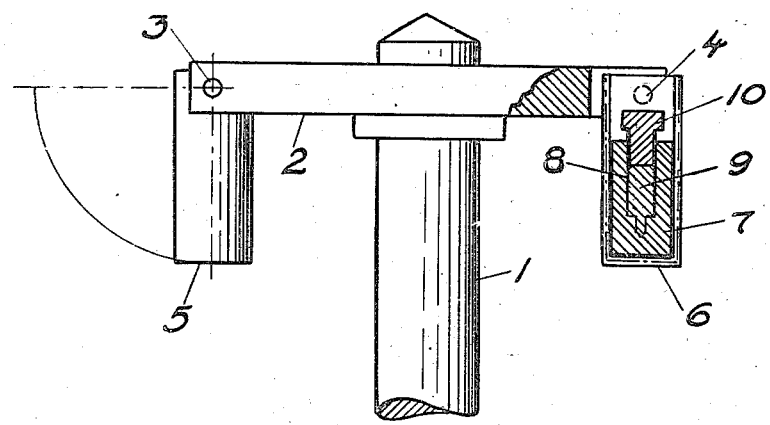

2,304,723

UNITED STATES PATENT OFFICE 2,304,723

PROCESS FOR THE MANUFACTURE OF ARTICLES OF SINTERED METALLIC CONSTITUENTS

Hans Herrman Wolff and Helfrid Anna Maria Larsson, Stockholm, Sweden, assignors to Aktiebolaget Hammarbylampan, Stockholm, Sweden, a company of Sweden Application November 23, 1940, Serial No. 366,844
In Sweden January 18, 1940

9 Claims. (Cl. 75—22)

This invention relates to a process for the manufacture of articles of sintered metallic constituents. In the present specification and claims the term "articles of sintered metallic constituents" is understood to include not only constituents such as metals and refractory (hard) alloys, but also additions of a more or less nonmetallic nature, such as carbides and other substances known in the manufacture of hard alloys.

In the art hitherto known great costs have been involved in manufacturing articles of a more complicated shape, particularly of sintered refractory (hard) alloys. In order to obtain products of sufficient hardness it is necessary to compress the components forming the alloy under a high pressure before or during the sintering operation. For this reason it has only been possible to obtain satisfactory results if the bodies to be pressed have a simple shape, such as rods, cubes, or plates. If attempts are made to compress the pulverulent components or constituents into articles of more complicated shapes the resulting products will not be homogenous because the friction between the particles of the pulverulent mixture causes an irregularity in the pressure, i. e. this pressure does not act uniformly over the whole of the moulded body, and the consequence is that the bodies become warped or deformed in the subsequent sintering process. Of course, it is possible to give the body the desired shape after the pressing or sintering process but that makes the finished article expensive, particularly if it does not consist of a solid body of revolution.

The main object of the present invention is to produce articles of sintered metals or refractory (hard) alloys in a simplified manner, even if the articles are of complicated shapes. A further object of the invention is to enable a commercial manufacture of articles of any desirable shape with an exactitude and a homogeneity heretofore not known. According to one feature of the invention the manufacture of the shaped bodies includes the steps of introducing a fine-grained mixture of the constituents forming the body into a mould in which the mixture is subjected to a centrifugal or throwing (slinging) action, preferably by moving the mould in a circular path. On account of this treatment the mixture in the mould is compressed into a coherent body suited for the subsequent sintering operation so that, after this sintering, a product with considerable density will be obtained. If desired, the fine-grained components forming the metallic article or alloy may be mixed with some agent adapted to reduce the friction between the individual particles of the mixture. Preferably, such an agent consists of a viscous organic liquid, such as glycerine. In many cases, however, the fine-grained components may be used in dry condition.

In the first attempts to employ the new method certain difficulties were encountered in removing the coherent body from the mould without smashing it. These difficulties arose even if split moulds were used. It is still a further object of the invention to eliminate these difficulties by choosing carbon or graphite as material for the mould. In this way the moulded product need not be removed from the mould prior to the sintering operation, but the latter may take place in the graphite mould itself. Thus, the whole process is rendered very simple.

The accompanying drawing illustrates one embodiment of an apparatus, by the aid of which the process according to the invention may be carried into effect. The figure of the drawing is a diagrammatic representation of a centrifugal device in which the mould or the moulds are caused to rotate at a high rate of speed.

To a main shaft 1 there is attached a cross bar, a plate or a disk 2, carrying one or more sleeves 5 and 6 adapted to swing on pivots 3 and 4, one sleeve 6 being shown in longitudinal section. Supported in this sleeve is a mould 7 having a recess 8, in which the constituents 9 of the pulverulent mixture above referred to are introduced. The recess 8 is shaped in conformity with the outlines of the desired shape of the body to be moulded, due regard having been paid to the shrinkage occurring during the subsequent sintering operation.

In operation the main shaft 1 is rotated causing the sleeves 5 and 6, which are arranged eccentrically with respect to the shaft 1, to swing outwardly about the pivots 3 and 4 due to the centrifugal action so as to finally assume an approximately horizontal position. The higher the speed of rotation is, the larger will the forces be that act to compress the constituents of the mixture in the mould to a more or less condensed or coherent body. The acting forces become greater in proportion to the distance of the material in the mould from the shaft 1. To augment the effect of the compressing centrifugal forces it may be found suitable as shown, to provide the orifice of the recess 8 with a plug 10 which increases the pressure on the surface of the mixture located closest to the axis of rotation during the centrifugation. Such a plug need not be solid but can consist of mercury for instance.

The centrifugation having been terminated, the mould is removed from the sleeve and introduced into a furnace for carrying out the sintering operation. A particular crucible is not necessary, since the mould itself can serve as such. The sintering having been effected, the finished body, which will then have shrunk to a considerable extent, may be readily removed from the mould.

It has been found that moulded or shaped sintered bodies produced in this manner show a great uniformity with respect to hardness and density. Moreover, it has been established that values of density that only with difficulty could be attained according to known pressing methods, may be easily achieved by our process. Since the method is also exceedingly simple to carry into effect, it entails very great advantages, and creates unexpected possibilities, especially in manufacturing articles of complicated shapes on a larger scale.

Especially in the manufacture of small objects it may be found suitable to provide a plurality of recesses in each mould so that a great number of sintered bodies will be produced simultaneously in the same machine. In this connection care should be taken, however, that the axis of symmetry of the bodies become horizontal during the centrifugal operation and lie in planes extending through the main shaft of the centrifugal machine, since otherwise deformation will readily occur in sintering by reason of unsymmetrical distribution of density within the body to be moulded. If desired, this disadvantage may be eliminated in another way, e. g. by rotating the moul about its own axis during the centrifugal operation. In this manner the influence of gravity on an irregular distribution of the material contained in the mould will also disappear.

In the manufacture of refractory (hard) alloys which generally consist of heavy carbides mixed with lighter auxiliary metals or compounds thereof, one could expect that the alloying material would be separated during the centrifugal operation so that the ultimate product might become inhomogenous. It has been found, however, that this is not the case, which to a large extent may be ascribed to the fact that on account of the protracted grinding the lighter components surround the heavier particles as a film so as to adhere to the same.

Graphite or carbon has proved to be the most suitable material for the mould. As it is desirable to attain a very smooth surface on the body produced the interior of the mould may be washed or coated with colloidal graphite which fills up all existing pores. As it may sometimes be difficult to provide the appropriate mould recesses in a piece of graphite, it has proved possible also to make the moulds by casting or pressing. In this case graphite powder may be mixed with some other material, such as ceramic material, and subsequently cast or pressed into the desired shape, if desired enclosed in a metallic casing in order that the mould shall be better apt to withstand pressure strains in the centrifugal operation. Metals, too, may be used in some cases as material for the mould. In the selection of material, however, should sintering be undertaken in the mould, care should be taken to see that the material of the mould does not react with the alloy. If a fusible metal, such as lead, is made use of, the mould will melt away already in an early stage of the sintering operation.

Instead of subjecting the body to be shaped in the mould to a centrifugation proper it is also possible to attain the desired compression of the material by slinging or throwing the mould in a closed path which need not be circular.

As many changes could be made in the above construction and many apparently widely different embodiments of the invention could be made without departing from the scope thereof, as defined by the following claims, it is intended that all matter contained in the above description or shown in the accompanying drawing shall be interpreted as illustrative and not in a limiting sense.

What we claim is:

1. A process of manufacturing shaped articles of sintered metallic constituents, comprising the steps of introducing a fine-grained mixture of the said constituents into a mould, subjecting the mixture in the mould to centrifugal forces so as to form a condensed body from the said mixture without application of heat to sintering temperature, and then sintering the said body.

2. A process of manufacturing shaped articles of sintered metallic constituents, comprising the steps of introducing a fine-grained mixture of the said constituents into a mould, subjecting the mixture in the mould to a slinging, throwing action so as to form a coherent body from the said mixture without application of heat to sintering temperature, and then sintering the said body.

3. A process of manufacturing shaped articles of sintered metallic constituents, comprising the steps of introducing a fine-grained mixture of the said constituents into a mould arranged in a centrifugal machine eccentrically with respect to the axis of rotation of the said machine, subjecting the mixture in the mould to centrifugal forces by moving the said mould in a circular path around the said axis of rotation so as to form a compressed body from the said mixture without application of heat to sintering temperature, and then sintering the said body.

4. A process of manufacturing shaped articles of sintered metallic constituents, comprising the steps of introducing a fine-grained mixture of the said constituents into a mould arranged in a centrifugal machine eccentrically with respect to the axis of rotation of the said machine, so that the axis of symmetry of the mould lies in a plane extending through the said axis of rotation, subjecting the mixture in the mould to centrifugal forces by moving the said mould around the said axis of rotation without application of heat to sintering temperature, and then sintering the said body.

5. A process of manufacturing shaped articles of sintered metallic constituents, comprising the steps of introducing a fine-grained mixture of the said constituents into a mould arranged in a centrifugal machine eccentrically with respect to the axis of rotation of the said machine, subjecting the mixture in the mould to centrifugation by moving the said mould in a circular path around the said axis of rotation without application of heat to sintering temperature, rotating the mould about its axis of symmetry during the said centrifugation, and then sintering the said body.

6. A process of manufacturing shaped articles of sintered metallic constituents comprising the steps of mixing the said constituents in a fine-grained condition with some agent adapted to reduce the friction between the individual particles of the said constituents, introducing the mixture into a mould, subjecting the mixture to centrifugal forces so as to form a condensed body from the said mixture without application of heat to sintering temperature, and then sintering the said body.

7. A process of manufacturing shaped articles of sintered metallic constituents comprising the steps of mixing the said constituents in a fine-grained condition with a viscous liquid to reduce the friction between the individual particles of the constituents, introducing the mixture into a mould, subjecting the mixture to centrifugal forces so as to form a coherent body from the said mixture without application of heat to sintering temperature, and then sintering the said body.

8. A process of manufacturing shaped articles of sintered metallic constituents, comprising the steps of introducing a fine-grained mixture of the said constituents into a mould, subjecting the mixture in the mould to centrifugal forces so as to form a compressed body from the said mixture without application of heat to sintering temperature, and then sintering the said body in the said mould.

9. A process of manufacturing shaped articles of sintered metallic constituents, comprising the steps of introducing a fine-grained mixture of the said constituents into a mould, consisting of graphite, subjecting the mixture in the mould to centrifugal forces so as to form a condensed body from the said mixture without application of heat to sintering temperature, and then sintering the said body.

HANS HERRMAN WOLFF.
HELFRID ANNA MARIA LARSSON.